UNITED STATES PATENT OFFICE.

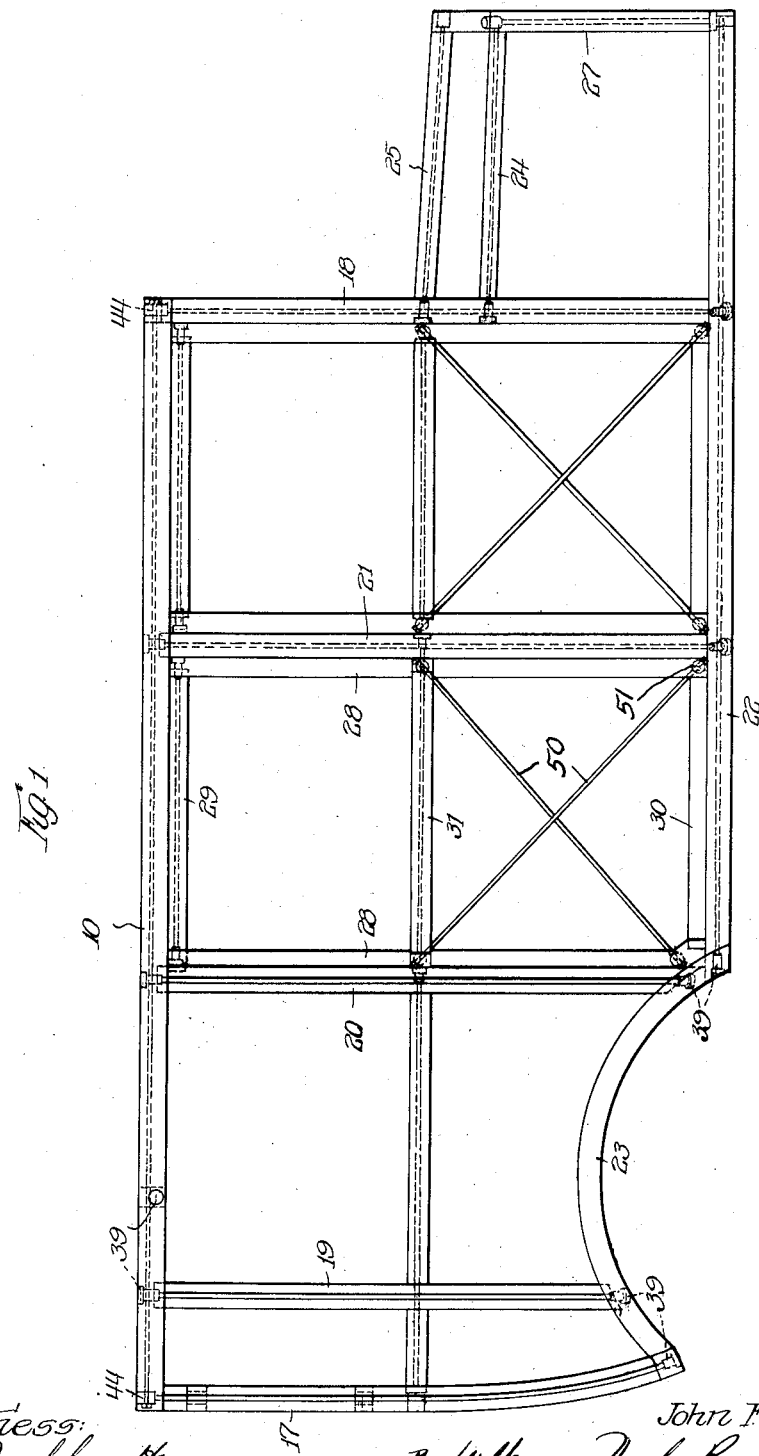

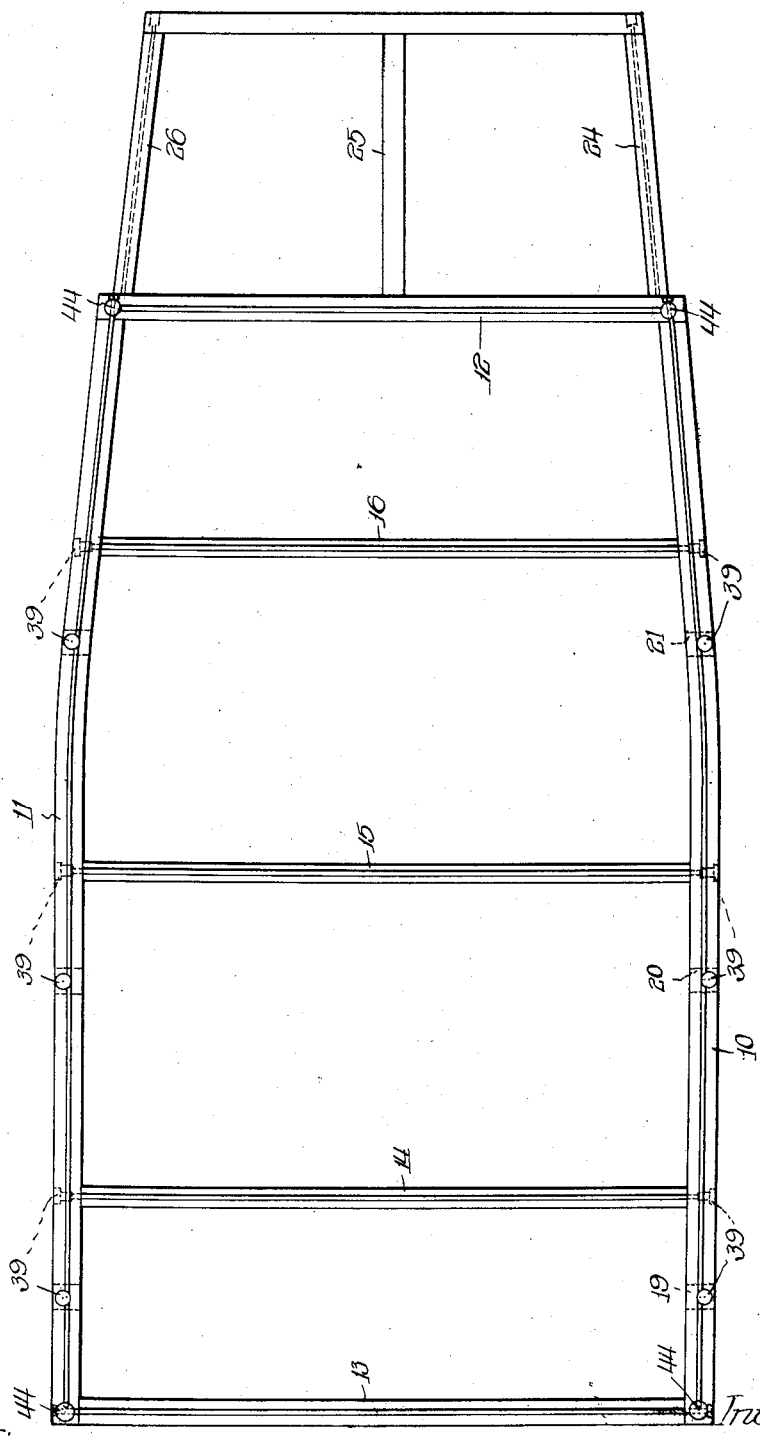

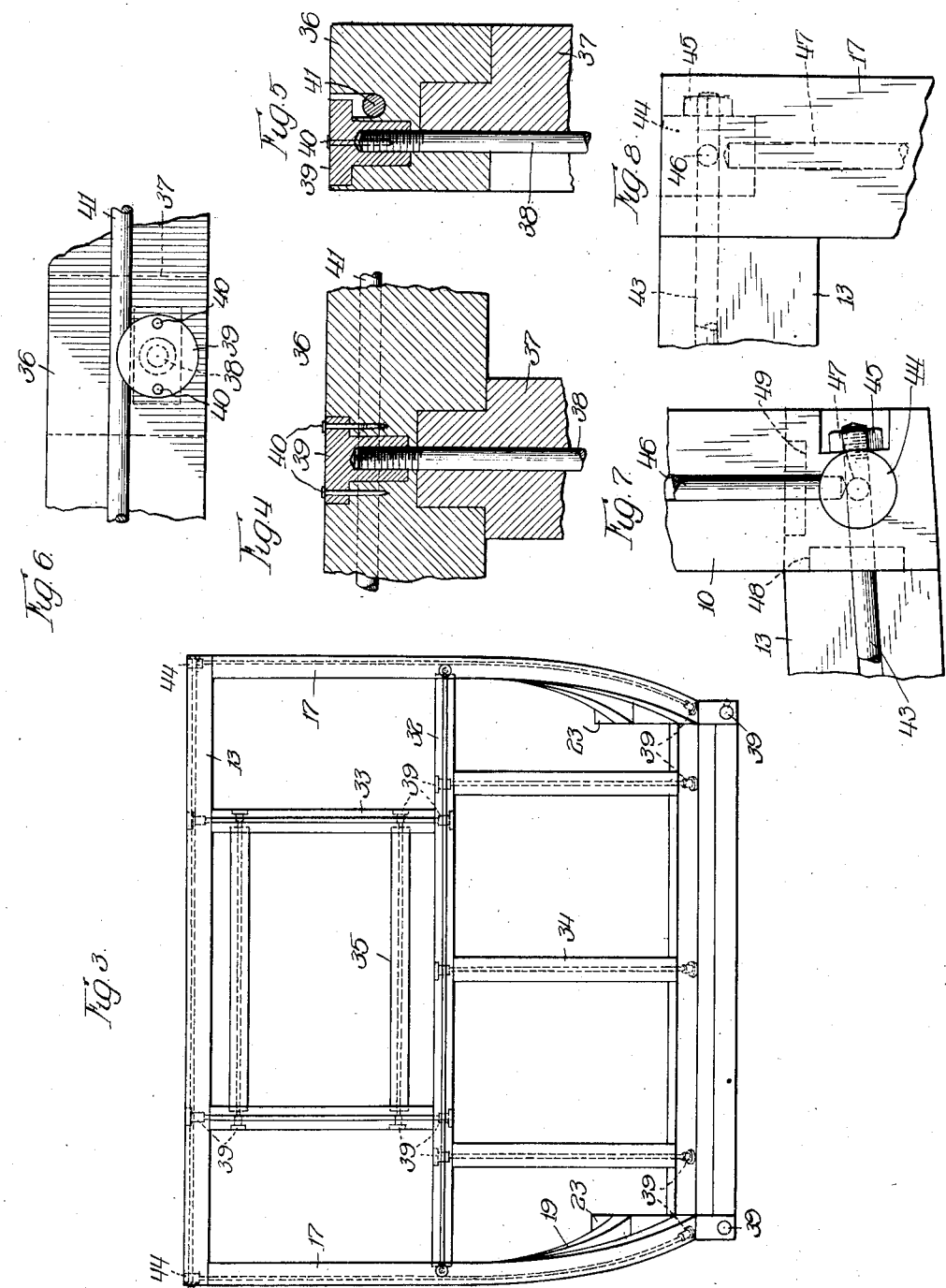

JOHN F. GODFREY, OF ELKHART, INDIANA.

METHOD OF REINFORCING AUTOMOBILE-BODIES.

1,388,250.  Specification of Letters Patent.  Patented Aug. 23, 1921.

Application filed December 20, 1920. Serial No. 431,820.

*To all whom it may concern:*

Be it known that I, JOHN F. GODFREY, a citizen of the United States, residing at Elkhart, in the county of Elkhart and State of Indiana, have invented certain new and useful Improvements in Methods of Reinforcing Automobile-Bodies, of which the following is a specification.

This invention relates to a new and improved vehicle body construction, and more specifically to a method of reinforcing particularly adapted for use in connection with bodies designed for motor vehicles.

Vehicle bodies of this type very generally have heretofore been constructed either with wooden frame and reinforcing members or with these members formed of metallic angle or channel bars. The wooden frame construction is open to many objections in that it is difficult to secure permanent joints which will not work loose under the very severe operating conditions caused by the continuous vibration of the vehicle and the torsional stresses created by turning corners at high speed. These frames are further subject to warping and relatively large members are necessary in order to secure adequate tensional strength.

The metallic frames are objectionable in that in order to secure sufficient rigidity the members must be made of a cross section which contains a large excess of metal over that required to impart the strength necessary, and they consequently are quite heavy. The metallic frames are further likely to produce a noisy body if any portions of the frame or casing members work loose under the vibration. The metallic frame is also exceedingly stiff and therefore does not furnish an easy riding vehicle.

It is an object of the present invention to provide a composite vehicle frame adapted to secure strength and stability without excess size or weight and without stiffness.

It is a further object to provide a frame of this character which is comparatively simple in construction and which may be formed of standardized parts by relatively unskilled labor.

Other and further objects will appear as the description proceeds.

My improved frame comprises broadly frame members preferably formed of wood or similar material having adequate strength to take up compression stresses and being of sufficient cross section for stability without undue weight. It further involves in connection with these frame members, tie members or tie rods formed of metal and so associated with the frame members as to secure them together and to take up the tensile stresses involved.

My invention further comprises improved anchor means adapted to secure and maintain the several tie and frame members in proper relation.

I have illustrated certain preferred embodiments of my invention in the accompanying drawing, in which—

Figure 1 is a side view of a vehicle frame constructed according to my invention;

Fig. 2 is a plan view of the upper members of Fig. 1;

Fig. 3 is a rear view showing the rear members of Fig. 1;

Fig. 4 is a fragmentary section illustrating a joint construction;

Fig. 5 is a cross section of Fig. 4;

Fig. 6 is a plan view of Fig. 4;

Fig. 7 is a plan view of another form of joint construction; and,

Fig. 8 is an elevation of Fig. 7.

As shown in Figs. 1 to 3, the frame comprises the longitudinal upper frame members 10, their ends being joined by the cross members 12 and 13 and the members being intermediately braced by the cross members 14, 15 and 16. The top frame is supported at its corners on the vertical frame members 17 and 18 and is provided with intermediate vertical braces 19, 20 and 21. The floor of the frame is provided with the lateral sills 22 and the curved rear sill members 23. As shown, the forward cowl portion comprises the horizontal upper members 24, 25 and 26 supported by the vertical members 18 and the front member 27, the latter having its lower ends engaging the sills 22. The door frames comprise the vertical members 28, the upper horizontal member 29, lower horizontal member 30 and intermediate brace 31. The rear as shown in Fig. 3 is formed of a transverse member 32 engaging upper and lower vertical members 33 and 34. The upper vertical members 33 are cross braced by the members 35.

The several members as indicated in the figures are provided with the metallic tie rods inclosed within the contour of the members. At intermediate points where the end of one member meets an intermediate portion of another member the tie rods are anchored by the form of anchor member shown in detail in Figs. 4 to 6. In these figures the continuous member is designated 36 and the intersecting member 37. The tie rod 38 extends through the intersecting member and has its end threaded into the anchor member 39. This member 39 is cylindrical in form, having an enlarged cylindrical head. It is fitted into a corresponding countersink in the member 36 so that it is wholly within the contour of that member. It is retained against rotation by the nails or equivalent members 40 which pass through the openings in the anchor member and engage the frame member 36. As shown in these figures, the tie rod 41 associated with the continuous member 36 is so located as not to intersect the cross tie member 38.

At the several corners of the vehicle the form of anchor and tie construction shown in Figs. 7 and 8 is utilized. Taking, for example, the point at which members 10, 13 and 17 intersect, the rod 42 in the member 13 passes loosely through an opening in the anchor member 44, the end of the rod being threaded to receive a nut 45 which may be screwed up to properly tension the rod. The rod 46 in the member 10 is threaded into an opening in the anchor member 44 and the rod 47 in the member 17 is similarly secured. These rods, as shown, intersect at a point and substantially at right angles with each other.

As indicated at 48 and 49 of Fig. 7, the frame members are preferably mortised together for greater rigidity. The doors have their lower portions cross braced by the tie rods 50 having their ends secured in the anchor members 5.

The tie members have been referred to as contained within the contour of the frame members and it is to be understood that this may be accomplished either by placing them in grooves or open channels or by passing them through longitudinal openings in the frame members.

By the use of my composite construction I retain all of the valuable features of wooden frames, including their lightness and ease of assembly, together with their relative resilience and consequent easy riding qualities. By the use of my tie rods I secure a strength and a rigidity impossible with a wooden frame alone and due to this strength the size of the wooden frame members may be considerably reduced. The several forms of anchor members are simple and the same forms are used throughout the frame, so that the construction is standardized to that extent. The frame may thus be readily and rapidly assembled by comparatively unskilled labor.

I claim:

1. In a vehicle body construction, interrelated frame members, and tie members extending between joints of said frame members, three tie members meeting at corners of said vehicle body, and an anchor member located at the point of meeting and adapted to be engaged by said members.

2. In a vehicle body construction, interrelated frame members, and tie members extending between joints of said frame members, three tie members meeting at corners of said vehicle body, and an anchor member located at the point of meeting having openings adapted to receive said three tie members, certain of the openings being adapted to make screw-threaded connection with the members and other of said openings to loosely engage the members.

3. In a vehicle body construction, interrelated frame members, tie rods inclosed in the frame members and extending between joints of the frame members, three frame members meeting at the corners of said vehicle body, and an anchor member at said junction having openings therein having axes intersecting substantially at right angles to each other, the openings receiving the ends of the tie rods, the anchor member serving to connect the tie rods and to maintain them in fixed relation relative to the frame members.

Signed at Elkhart, Indiana, this 16th day of December, 1920.

JOHN F. GODFREY.